United States Patent
Carbunar et al.

(10) Patent No.: US 7,532,587 B2
(45) Date of Patent: May 12, 2009

(54) METHOD AND APPARATUS FOR PERFORMING ANONYMOUS SOURCE ROUTING

(75) Inventors: Bogdan O. Carbunar, Hoffman Estates, IL (US); Michael D. Pearce, Barrington, IL (US); Weidong Shi, Streamwood, IL (US); Yang Yu, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 314 days.

(21) Appl. No.: 11/470,291

(22) Filed: Sep. 6, 2006

(65) Prior Publication Data

US 2008/0056136 A1    Mar. 6, 2008

(51) Int. Cl.
*H04L 12/28* (2006.01)
(52) U.S. Cl. .................. 370/254; 370/392; 370/400; 709/242
(58) Field of Classification Search ......... 370/254–256, 370/389, 392
See application file for complete search history.

(56) References Cited

U.S. PATENT DOCUMENTS

| 6,535,498 | B1 * | 3/2003 | Larsson et al. | 370/338 |
|---|---|---|---|---|
| 2003/0204623 | A1 * | 10/2003 | Cain | 709/241 |
| 2004/0022224 | A1 * | 2/2004 | Billhartz | 370/338 |
| 2004/0233882 | A1 * | 11/2004 | Park et al. | 370/338 |
| 2005/0041675 | A1 * | 2/2005 | Trostle et al. | 370/401 |
| 2007/0076681 | A1 * | 4/2007 | Hong et al. | 370/349 |
| 2007/0293197 | A1 * | 12/2007 | Ekberg et al. | 455/414.1 |
| 2008/0187001 | A1 * | 8/2008 | Vaswani et al. | 370/466 |

OTHER PUBLICATIONS

Johnson et al, "DSR: The Dynamic Source Routing Protocol for Multi-hop Wireless Ad Hoc Networks", 2001 Computer Science Department, http://www.monarch.cs.cmu.edu, 25 pages.*
Korba et al, "AnonDSR: Efficient Anonymous Dynamic Source Routing for Mobile Ad Hoc Networks",2005 ACM workshop on security of ad-hoc and sensor networks (SASN 2005), 11 pages.*
Marco Gruteser and Dirk Grunwald, "Anonymous Usage of Location-Based Services Through Spatial and Temporal Cloaking," Proceedings of the First International Conferences on Mobile Systems, Applications, and Services, 2003.
Marco Gruteser, et al., "Privacy-Aware Location Sensor Networks," 25th IEEE International Conference on Distributed Computing Systems. 2005.

* cited by examiner

*Primary Examiner*—Hassan Kizou
*Assistant Examiner*—Mounir Moutaouakil (57) ABSTRACT

During operation, each client device will be provided with a list of addresses for all nodes within a network. The addresses for all nodes will be unique to a particular client device such that {address(node 1), address(node 2), . . . address(node n)} for a first client does not equal {address(node 1), address (node 2), . . . address(node n)} for a second client. Each client's address for a particular node will preferably only be known by the client and a naming server. When sending a message to a destination node, a client device will create a source route consisting of the unique addresses. Because each client's address for a particular node will only be known to itself and the naming server, anyone who intercepts the route will not know what nodes along the route are used for routing the message.

18 Claims, 8 Drawing Sheets

FIG. 1
100

| Address of node 1 | | 10.2.22.272 |
|---|---|---|
| Address of node 2 | = | 10.3.56.665 |
| payload | | payload |

Client 1 message

| Address of node 1 | | 10.4.24.244 |
|---|---|---|
| Address of node 2 | = | 10.1.122.222 |
| payload | | payload |

Client 2 message

FIG. 2

| K | | K |
|---|---|---|
| Hash(K, Address of node 1) | | Hash(K, 10.2.22.272) |
| Hash(K, Address of node 2) | = | Hash(K, 10.3.56.665) |
| payload | | payload |

Client 1 message

| K | | K |
|---|---|---|
| Hash(K, Address of node 1) | | Hash(K, 10.4.24.244) |
| Hash(K, Address of node 2) | = | Hash(K, 10.1.122.222) |
| payload | | payload |

Client 2 message

FIG. 3

| K |
|---|
| Hash(K, Address of node 1) |
| Hash(K, Address of node 2) |
| $R_1$ |
| $R_2$ |
| $R_3$ |
| $R_4$ |
| $R_5$ |
| payload |

=

| K |
|---|
| Hash(K, 10.2.22.272) |
| Hash(K, 10.3.56.665) |
| 10.4.56.174 |
| 123.234.246.46 |
| 34.45.32.879 |
| 98.34.212.23 |
| 56.46.154.251 |
| payload |

Client 1 message

Node virtual address table

FIG. 8
605

Reply message

METHOD AND APPARATUS FOR PERFORMING ANONYMOUS SOURCE ROUTING

FIELD OF THE INVENTION

The present invention relates generally to source routing and in particular, to a method and apparatus for performing anonymous source routing.

BACKGROUND OF THE INVENTION

The traditional trust model of most existing sensor networks assumes that the owner and deployer of the network is also the collector and consumer of sensor readings. While this makes sense for small, experimental networks, this is likely not to be the case for large scale sensor networks. Programs and projects such as Sensor Networks for Cabled Ocean Observatories, the Environmental Protection Agency's Remote Sensing Information Gateway, Ocean US, The National Office for Integrated and Sustained Ocean Observations, and others are involved in building ocean observatories and systems (including sensor networks) for observing and reporting earth, ocean and atmosphere information needed to address complex environmental problems. The trust model of large scale sensor networks is shaped by two major factors. First, multiple organizations (e.g., government agencies, universities and companies) are involved, acting both as funding sources and primary investigators. Even though network owners need to collaborate for administrative purposes, they may not fully trust each other, due to diverging interests. Second, external organizations interested in the areas monitored by the sensor network may be willing to pay for access to sensor readings. However, providing support for third party (client) queries raises privacy and efficiency issues. Clients may not be willing to disclose areas of interest or access patterns, whereas the owner(s) of the network will want to preserve the network's resources.

Thus, for large-scale networks, it becomes increasingly difficult to keep the locations of such queries confidential. For example, the server may find that the client is interested only in readings from sensors placed in a certain area (e.g., coverage boundary sensors) or that the client is accessing sensor readings only in a certain order (e.g., if the temperature in region $R_i$ is above T, query region $R_j$, otherwise query region $R_k$). Additionally, sometimes a user who has the same query to make over and over again, will wish this fact to be hidden from others as well. Therefore, a need exists for a method and apparatus for performing anonymous source routing such that locations of queries can be kept confidential.

DETAILED DESCRIPTION OF THE DRAWINGS

In order to address the above-mentioned need, a method and apparatus for performing anonymous source routing is described herein. During operation, each client device will be assigned a list of addresses for all nodes within a network. The addresses for all nodes will be unique to a particular client device such that {address(node 1), address(node 2), . . . address(node n)} for a first client does not equal {address (node 1), address(node 2), . . . address(node n)} for a second client. This is done by the client through a naming server, that has the ability of assigning a different name to each node in the network. Each client's address for a particular node will preferably only be known by the client and a naming server. When routing a message, each client device will create a source route consisting of its unique addresses. Because each client's address for a particular node will only be known to itself and the naming server, anyone who intercepts the route will not know what nodes along the route are used for routing the message.

The present invention encompasses a method for performing anonymous source routing for a client device. The method comprises the steps of determining a payload needs to be sent to a destination node, determining a route to the destination node, and creating a message having the route to the destination node and the payload. The route to the destination node comprises an address of the destination node and addresses of intervening nodes and nodes within the system may have multiple addresses and the addresses {a(node 1), a(node 2), . . . a(node n)} for all clients within the system are unique to a particular client such that {a(node 1), a(node 2), . . . a(node n)} for the first client does not equal {a(node 1), a(node 2), . . . a(node n)} for a second client.

The present invention additionally encompasses a method for performing anonymous source routing. The method comprises the steps of receiving by a node, a message having the route to a destination node and a payload, where the route to the destination node comprises an address of the destination node and addresses of intervening nodes. A determination is made if an address from a first address field in the message matches one of a plurality of addresses in a database and it is assumed that the message was directed towards the node if the first address from the message matches one of a plurality of addresses in a database.

The present invention additionally encompasses a client device comprising logic circuitry determining a payload needs to be sent to a destination node and determining a route to the destination node. The logic circuitry then creates a message having the route to the destination node and the payload, where the route to the destination node comprises an address of the destination node and addresses of intervening nodes, and where nodes within the system may have multiple addresses and the addresses {a(node 1), a(node 2), . . . a(node n)} for all nodes within the system are unique to a particular client device such that {a(node 1), a(node 2), . . . a(node n)} for the first client device does not equal {a(node 1), a(node 2), . . . a(node n)} for a second client device.

Prior to describing a sensor network in accordance with the preferred embodiment of the present invention the following text and equations are provided to set the necessary background for utilization of the preferred embodiment of the present invention.

We consider a sensor network that is operated by dedicated server(s), and shared among multiple clients. Clients can access the network by sending queries to the server(s), which in turn issue the queries into the network. We assume that a routing tree exists for the sensor network and that all the queries are sent to the root of the tree. The root initiates the transmission of a query in the sensor network, collects the results and forwards them to the querying server which on its turn sends them to the issuing client.

A widely used class of queries in sensor networks consists of acquiring sensor readings from a specified region. Examples of such queries include, "how many cars have passed region A from time T?", or "what is the current temperature in region B?". While the solutions we present support both client queries and registration of events at regions of interest, in the following we focus only on client queries.

Without loss of generality, we assume that the entire area covered by the network is divided into a set of n regions, identified by $R=\{R_1, R_2, \ldots, R_n\}$. Each query targets a subset of regions specified through their identifiers. When regions are small enough, each region can contain a single sensor.

Source Routing: An additional assumption is that any sensor network will be utilizing a source-routing protocol for routing queries to a particular destination node. Source Routing is a technique whereby the sender of a packet (i.e. client) can specify the route that a packet should take through the network, toward its intended destination. For source routing, the sender of the packet generates a message containing the packet, along with routing information. The packet is also denoted as the payload of the message. In source routing, the sender node makes all of the routing decisions and specifies the exact route the packet must take. The message is sent through the network as a succession of broadcast primitives.

The message contains information about nodes through which, the message is to be routed. This information is organized as a list. A node that receives a source route message checks to see if information about its address is contained in the message. If the particular node does not find its address on the list, it discards the message. If the particular node determines that its address is at the top of the list, it assumes that the route is to pass through the particular node. The particular node removes its address from the top of the list, places its address at the bottom of the list, and then broadcasts the message. If, however, the particular node determines that there are no more addresses to forward the message to, the particular node assumes that the payload of the message is for the particular node, and acts accordingly on the payload. This node is the intended destination of the payload. If the destination node needs to send a reply back to the sender, it uses the list contained in the message to achieve this goal. That is, the destination node removes its information from the end of the list and broadcasts the reply, along with the resulting list. As described above, a node that receives such a message discards it if information about itself is not contained in the list. However, if the node finds the information at the end of the list, it removes the information and broadcasts the result.

Figure 1:
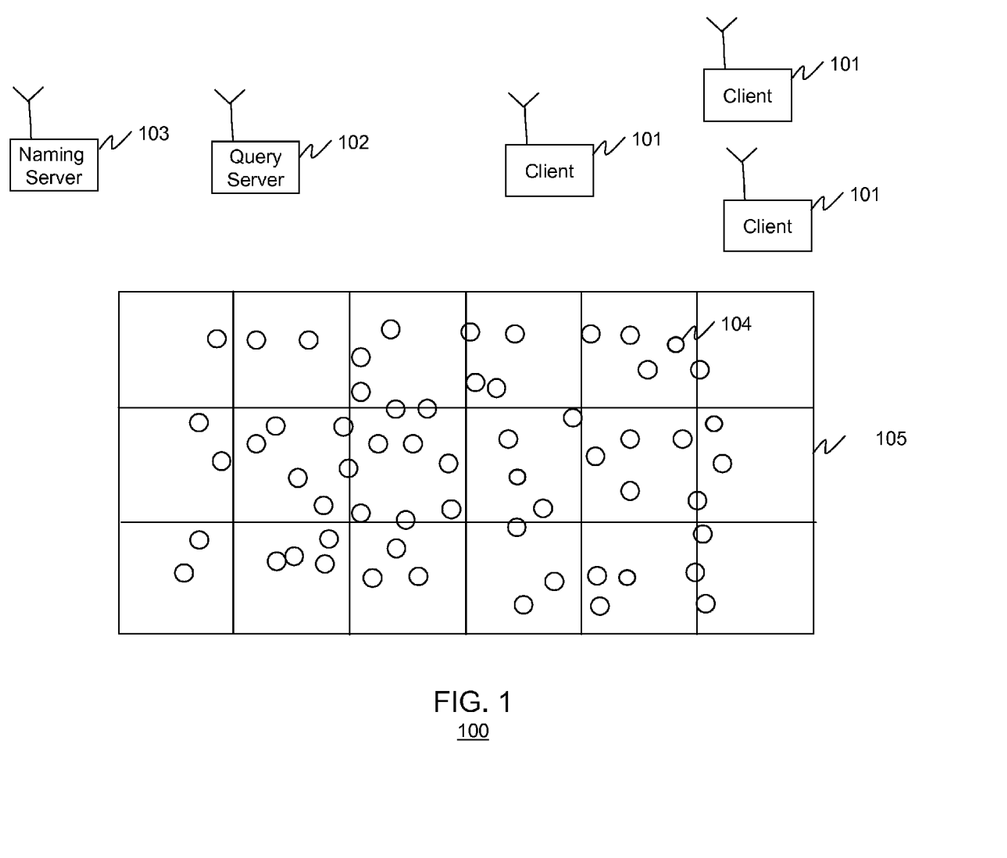
FIG. 1 is a block diagram of a sensor network.

Turning now to the drawings, wherein like numerals designate like components, FIG. 1 is a block diagram of sensor network 100. It is assumed that network 100 operates using source routing. Additionally it is assumed that all communications among devices occurs via wireless communication, however, this need not be the case.

As shown, network 100 comprises client devices 101, query server 102, naming server 103, and a plurality of nodes 104 (only one labeled) existing within a plurality of regions 105 (only one labeled). During operation, client device 101 will query server 102 with a message containing a query that is destined to a particular node 104. Because network 100 utilizes source routing, the message will also contain the particular route to a queried node 104.

As discussed above, since clients 101 perform their queries through server 102, they may leak their interests. Intuitively, a private outsourcing protocol should transform the actual query sequence into a "camouflage sequence", making it difficult (or computationally infeasible) for the server(s) to retrieve both the actual regions of interest and the access patterns of clients.

In order to address this issue, nodes 104 within the system 100 will have multiple addresses and the addresses {address (node 1), address (node 2), ... address (node n)} for all nodes within the system are unique to a particular client 101 such that {address(node 1), address(node 2), ... address(node n)} for a first client 101 does not equal {address(node 1), address (node 2), ... address(node n)} for a second client 101. Stated more generally, each client 101 will be provided with addresses for nodes 104 that differ from each other and from addresses corresponding to other clients. These addresses will be assigned to nodes in the network by naming server 103. Thus, the address for a particular node 104 may be, for example 10.2.22.272 for a first client, yet may be 10.4.24.244 for another client.

This is illustrated in Table 1 for n nodes and N clients.

TABLE 1

| | Addresses for clients 1 through n | | | |
|---|---|---|---|---|
| Node | Address for client 1 | Address for client 2 | ... | Address for client N |
| 1 | 10.2.22.272 | 10.4.24.244 | ... | 10.3.33.233 |
| 2 | 10.3.56.665 | 10.1.122.222 | ... | 10.89.44.25 |
| . | . | . | ... | . |
| . | . | . | . | . |
| . | . | . | . | . |
| n | 10.24.225.678 | 10.54.78.98 | ... | 10.77.456.54 |

Each client's address for a particular node will only be known by the client and the naming server. Thus, when query server 102 receives a route, it will not know the nodes corresponding to the addresses within the route. This routing technique is illustrated in FIG. 2.

Figure 2:
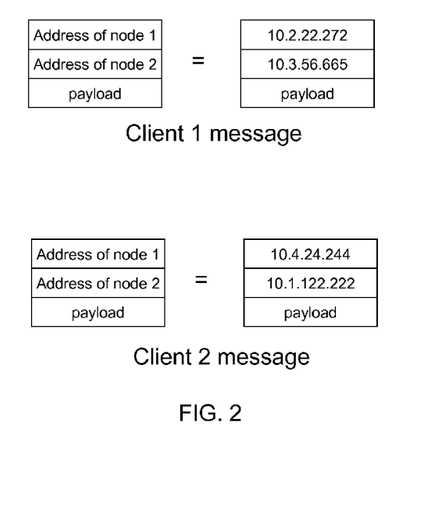
FIG. 2 illustrates source routing.

In FIG. 2 it is assumed that both clients 1 and 2 wish to send the same payload to node 2 through node 1. Both clients 1 and 2 will create a message containing the route and the payload. The route will contain a series of nodes for which the payload is to travel through. As is evident, although both clients will send the same payload through the same nodes, their messages differ in that the addresses used for each node 104 is specific to the particular client 101.

Figure 3:
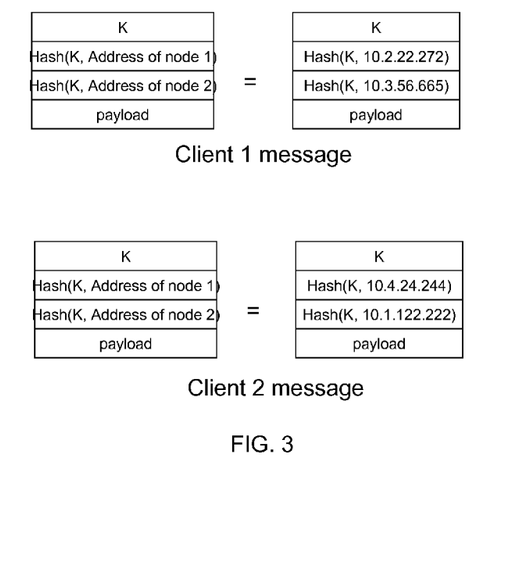
FIG. 3 illustrates source routing with hashing.

As discussed above, sometimes a client who has the same query to make over and over again, will wish this fact to be hidden from others. With this in mind, the addresses to the individual nodes may be hashed/processed with a one-way function and a random number (K). The message will then contain the random number K along with the processed addresses. This is illustrated in FIG. 3 for hashing.

Figure 4:
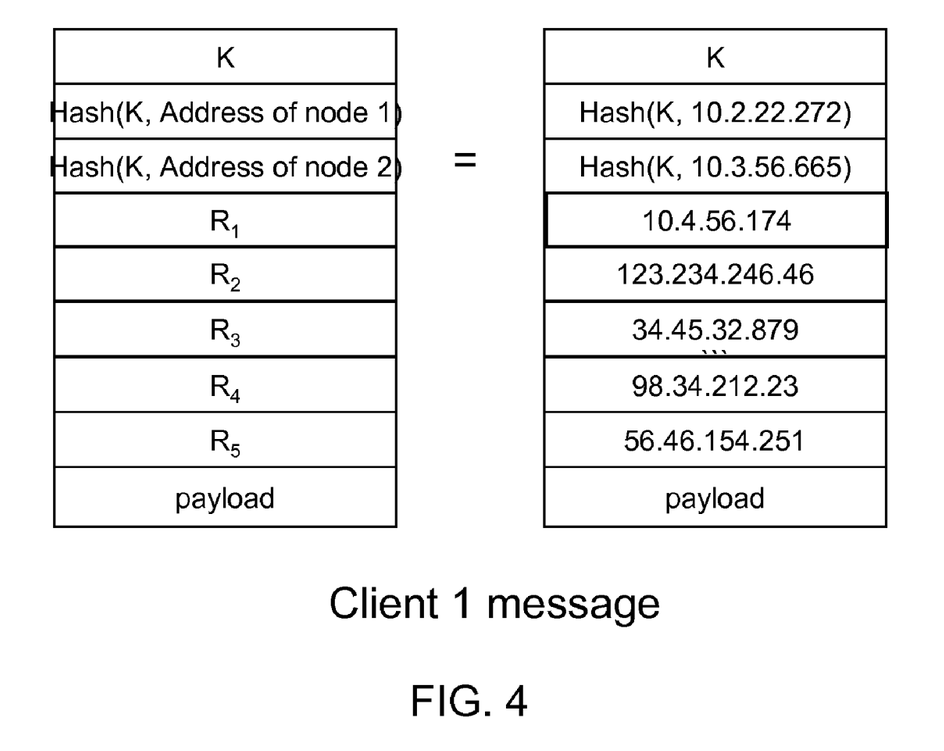
FIG. 4 illustrates source routing with hashing and padding.

With source routing, the number of addresses, or hops, in a message will leak how "deep" in the network the message will be sent. This can be hidden by padding the message with random numbers (R), up to the maximum length of any path in the network. The length of the random numbers has to be equal to the size of the image of the one-way function used to encode virtual sensor addresses. This is illustrated in FIG. 4.

Figure 5:
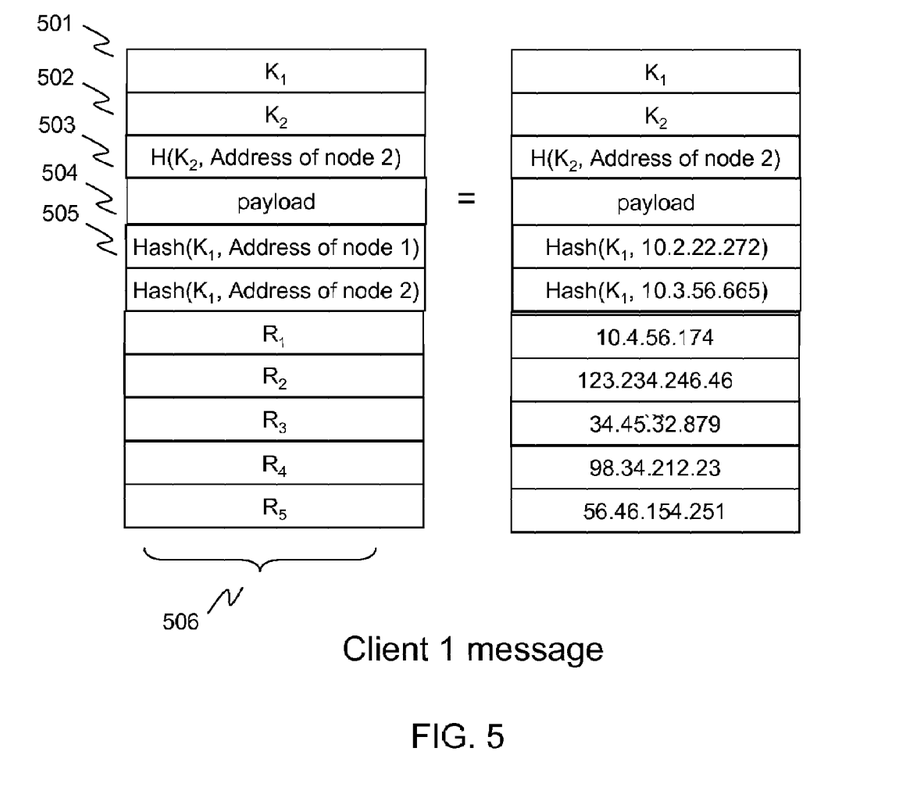
FIG. 5 illustrates a client message.

Padding the message with random numbers makes it more difficult for a node to determine if it is the intended destination of the message. This problem is solved through the addition of a stopping condition. More precisely, the stopping condition consists of a fresh random number (K') and of the application of the one-way function to the random number K' and the address of the intended destination node. This is illustrated in FIG. 5. As shown, random number 501 and 502 are inserted in message 506. Random number 501 is used to hash all addresses 505 but the destination address, while random number 502 is used to hash the destination address 503.

Figure 6:
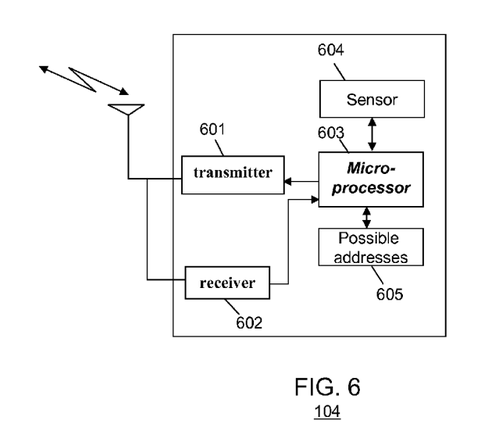
FIG. 6 is a block diagram of a node.

FIG. 6 is block diagram of a node that may be utilized as either a destination node or an intervening node used for routing messages. As shown, node 104 comprises logic circuitry 603 (microprocessor 603), receive circuitry 602, transmit circuitry 601, sensor 604, and database 605 containing possible addresses for the node. Logic circuitry 603 preferably comprises a microprocessor controller, such as, but not limited to a Freescale PowerPC microprocessor. In the preferred embodiment of the present invention logic circuitry 603 serves as means for controlling node 104, and as means for analyzing message content to determine any actions needed. Additionally receive and transmit circuitry are common circuitry known in the art for communication utilizing a well known communication protocol, and serve as means for transmitting and receiving messages.

Sensor 604 may be any sensor that senses environmental parameters. For example, sensor 601 may comprise a waveheight sensor, a wind sensor, a temperature sensor, . . . , etc.

Figure 7:
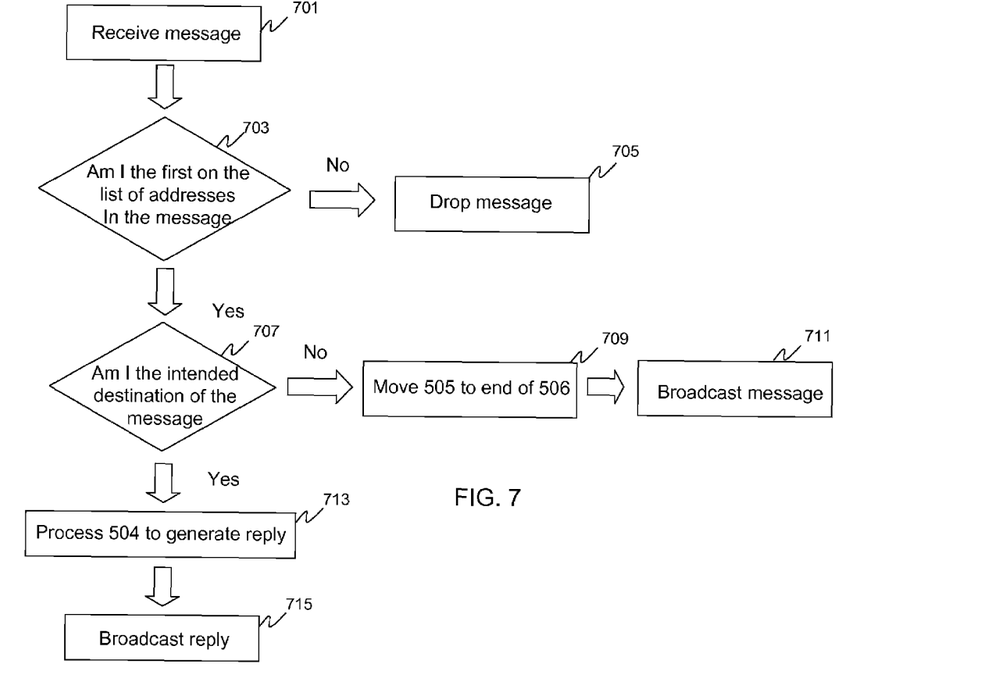
FIG. 7 is a flow chart showing operation of the node.

As described above, node 104 may be utilized as an intervening node for routing, or as a destination node from which information is requested. Regardless of how node 104 is functioning, during operation, receiver will receive a message comprising of payload and routing information. The routing process is illustrated in FIG. 7.

At step 701 a message is received by receiver 602. Logic circuitry 603 determines if the node needs to route the message or not by determining if one of its possible addresses is first on the list of addresses within the message (step 703). This determination is made by logic circuitry 603 determining (via the one-way function) the first address 505 from the list in message 506, and accessing database 605. The determination is accomplished by comparing the field 505 from the message with the output of the one-way function H successively applied to the field 501 of the message and addresses from the database 605. If the first address from the message matches one of the possible addresses in database 605, the logic circuitry 603 assumes that the message was directed towards the node and the logic flow continues to step 707, otherwise the logic flow continues to step 705 where the message is dropped.

Figure 8:
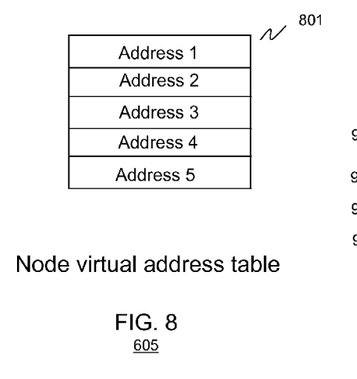
FIG. 8 illustrates an address table within a node's database.

Database 605 is illustrated in FIG. 8, and basically comprises a list of all possible addresses for node 104. As discussed above, each client device 101 will preferably have a unique address for each node 104, with each node maintaining all possible addresses for the node. It should be noted that if the number of client devices is great, client devices 101 may share an address for a particular node, however, they will not share addresses for all nodes so that {address(node 1), address(node 2), . . . address(node n)} for a first client 101 does not equal {address(node 1), address(node 2), . . . address (node n)} for a second client 101.

At step 707, logic circuitry 603 determines if the node is the destination node, or an intervening node. This is accomplished by comparing first field 503 from the message (containing an address) with the output of the one-way function successively applied to the field 502 of the message and addresses from the database 605.

If the logic circuitry 603 determines that the node is not the destination node, the logic flow continues to step 709 where logic circuitry 603 modifies the message by moving field 505 to the end of the message and broadcasts the resulting message (step 711). However, if the node is the intended destination, the logic flow continues to step 713 where logic circuitry 603 waits for an interval of time proportional to the number of remaining addresses (padding) in the message. It then processes the payload of the message (field 504) generates a reply and broadcasts the reply (step 715). The reply message is detailed in FIG. 9.

Figure 9:
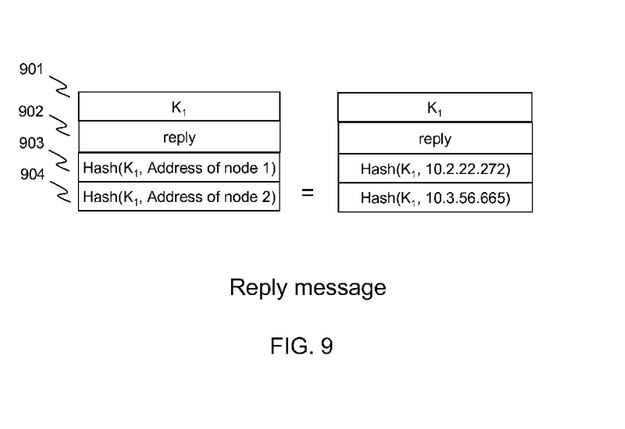
FIG. 9 is a block diagram of a reply message.

As shown, reply message comprises a random variable 901, the reply 902, and a list of addresses 903-904. When a node receives a reply message, logic circuitry 603 verifies if the last field of the reply (904) matches any of its addresses. This is done by comparing field 904 with the output of the one-way function repeatedly applied to field 901 of the reply message and each of the addresses of the node, stored in database 605. If no match is detected, the logic circuitry drops the message. If a match is detected, logic circuitry 603 removes the last address (904) from the reply message. It then verifies if the list of addresses contained in the reply message is empty. If it is, it directly sends the reply to the query server 102. If the list is not empty, it broadcasts the resulting reply message.

Figure 10:
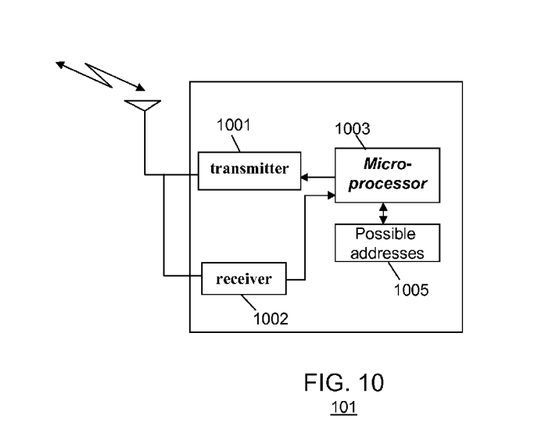
FIG. 10 is a block diagram of a client device.

FIG. 10 is block diagram of a client device. As shown, client device 101 comprises logic circuitry 1003 (microprocessor 1003), receive circuitry 1002, transmit circuitry 1001, and database 1005 containing a unique set of addresses for all nodes 104 within the network. As discussed above addresses {address(node 1), address (node 2), . . . address (node n)} for all nodes within the system are unique to a particular client 101 such that {address(node 1), address(node 2), . . . address (node n)} for a first client 101 does not equal {address(node 1), address(node 2), . . . address(node n)} for a second client 101. Stated more generally, each client 101 will be assigned addresses for nodes 104 that differ from each other. These addresses will be assigned by naming server 103.

Logic circuitry 1003 preferably comprises a microprocessor controller, such as, but not limited to a Freescale PowerPC microprocessor. In the preferred embodiment of the present invention logic circuitry 1003 serves as means for controlling node 104, and as means for analyzing message content to determine any actions needed. Additionally receive and transmit circuitry are common circuitry known in the art for communication utilizing a well known communication protocol, and serve as means for transmitting and receiving messages.

Figure 11:
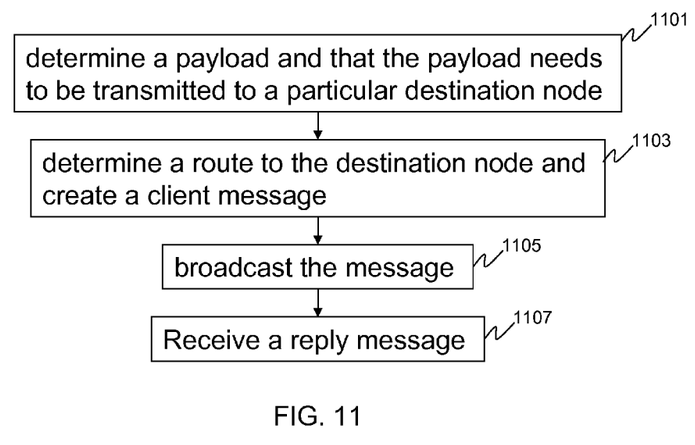
FIG. 11 is a flow chart showing operation of the client device of FIG. 10.

FIG. 11 is a flow chart showing operation of the client device of FIG. 10. The logic flow begins at step 1101 where logic circitry 1003 determines a payload and that the payload needs to be transmitted to a particular destination node 104. At step 1103 logic circuitry 1003 determines a route to the destination node and creates a client message (e.g., the message shown in FIG. 5.) As discussed above, the message will contain at least the payload and the route to the destination node. As discussed above, the route to the destination node will comprise addresses for nodes 104 along the route (i.e., the address of the destination node and addresses of intervening nodes) where {address(node 1), address(node 2), . . . address(node n)} for a first client 101 does not equal {address (node 1), address(node 2), . . . address(node n)} for a second client 101. As discussed above, the addresses may be processed with a one-way function and a random variable. Additionally, the message may contain the random variable and padding.

At step 1105, transmitter 1001 broadcasts the message, and finally, at step 1107, receiver 1002 receives a reply message.

While the invention has been particularly shown and described with reference to a particular embodiment, it will be understood by those skilled in the art that various changes in form and details may be made therein without departing from the spirit and scope of the invention. For example, while the above description was given with respect to a sensor network, one of ordinary skill in the art will recognize that the above address scheme may be utilized for any type of network utilizing source routing. It is intended that such changes come within the scope of the following claims.

The invention claimed is:

1. A method for performing anonymous source routing for a client device in a system where the client device can send messages to any one of multiple nodes, the method comprising the steps of:
   the client device determining a payload needs to be sent to a destination node;
   the client device determining a route to the destination node;
   the client device creating a message having the route to the destination node and the payload, wherein the route to the destination node comprises an address of the destination node and addresses of intervening nodes where nodes within the system use multiple addresses when participating in source routing and wherein routing addresses of the destination node and routing addresses of the intervening nodes used by the client to access the nodes differ from routing addresses of the destination node and routing addresses of the intervening nodes used by other clients to access the nodes and are not known by the other clients.

2. The method of claim 1 wherein the address of the destination node and the addresses of the intervening nodes are processed with a one-way function and a random variable.

3. The method of claim 1 wherein the address of the destination node and the addresses of the intervening nodes are hashed with a random variable.

4. The method of claim 3 wherein the message further comprises the random variable.

5. The method of claim 1 wherein the message further comprises padding.

6. A method for performing anonymous source routing in a system where a client can send messages to any one of multiple nodes, the method comprising the steps of:
   receiving by a node, a message having a route to a destination node and a payload, wherein the route to the destination node comprises an address of the destination node and addresses of intervening nodes, and where nodes within the system use multiple addresses when participating in source routing and wherein routing addresses of the destination node and routing addresses of the intervening nodes used by the client to access the nodes differ from routing addresses of the destination node and routing addresses of the intervening nodes used by other clients to access the nodes and are not known by the other clients;
   determining by the node if an address from a first address field in the message matches one of a plurality of addresses in a database; and
   assuming by the node that the message was directed towards the node if the first address from the message matches one of a plurality of addresses in a database.

7. The method of claim 6 further comprising the steps of:
   determining if the node is a destination node; and
   generating a reply message when the node is the destination node.

8. The method of claim 7 wherein the step of determining if the node is the destination node comprises the step of comparing an address from a particular field from the message to addresses from the plurality of addresses in the database.

9. The method of claim 6 further comprising the steps of:
   determining that the node is not the destination node; and
   modifying the message by moving the first address field to another part of the message; and
   re-broadcasting the modified message.

10. A client device existing in a system where the client device can send messages to any one of multiple nodes, the client device comprising:
    logic circuitry determining a payload needs to be sent to a destination node and determining a route to the destination node, the logic circuitry creating a message having the route to the destination node and the payload, wherein the route to the destination node comprises an address of the destination node and addresses of intervening nodes where nodes within the system use multiple addresses when participating in source routing and wherein routing addresses of the destination node and routing addresses of the intervening nodes used by the client to access the nodes differ from routing addresses of the destination node and routing addresses of the intervening nodes used by other clients to access the nodes and are not known by the other clients.

11. The client device of claim 10 wherein the address of the destination node and the addresses of the intervening nodes are processed by the logic circuitry with a one-way function and a random variable.

12. The client device of claim 10 wherein the address of the destination node and the addresses of the intervening nodes are hashed by the logic circuitry with a random variable.

13. The client device of claim 12 wherein the message further comprises the random variable.

14. The client device of claim 10 wherein the message further comprises padding.

15. A node existing in a system where a client can send messages to any one of multiple nodes, the node comprising:
    a receiver receiving, a message having a route to a destination node and a payload, wherein the route to the destination node comprises an address of the destination node and addresses of intervening nodes, and where nodes within the system use multiple addresses when participating in source routing and wherein routing addresses of the destination node and routing addresses of the intervening nodes used by the client to access the nodes differ from routing addresses of the destination node and routing addresses of the intervening nodes used by other clients to access the nodes and are not known by the other clients;
    a database; and
    logic circuitry determining if an address from a first address field in the message matches one of a plurality of addresses in a database and assuming the message was directed towards the node if the first address from the message matches one of a plurality of addresses in the database.

16. The node of claim 15 wherein the logic circuitry determines if the node is a destination node and further comprising:
    a transmitter forwarding a reply message when the node is the destination node.

17. The node of claim 15 wherein the logic circuitry determines if the node is the destination node by comparing an address from a particular field from the message to addresses from the plurality of addresses in the database.

18. The method of claim 17 wherein if the logic circuitry determines that the node is not the destination node, the logic circuitry modifies the message by moving the first address field to another part of the message and instructs a transmitter to rebroadcast the modified message.

* * * * *